July 13, 1965  T. W. F. BROWN  3,194,222
MECHANISM FOR CONTROLLING THE RATE OF RISE OF PRESSURE AND
THE MAXIMUM PRESSURES IN HIGHLY-RATED
INTERNAL COMBUSTION ENGINES
Filed May 18, 1964  2 Sheets-Sheet 2
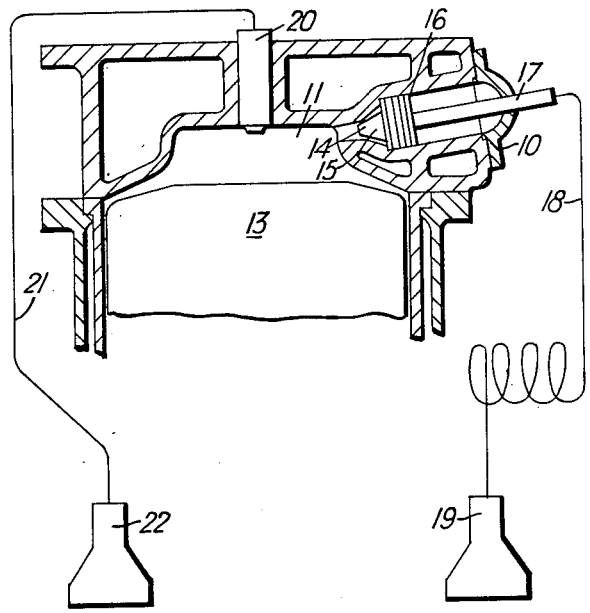
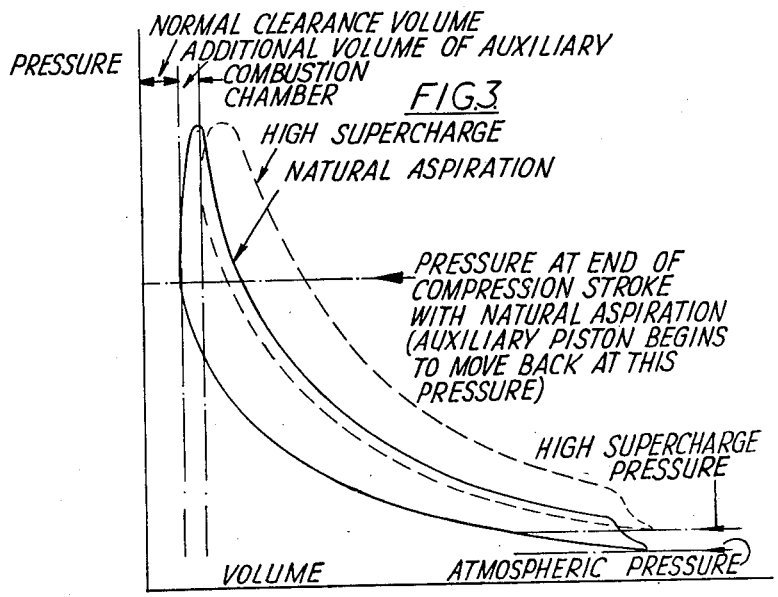
Inventor
THOMAS WALTER FALCONER BROWN
By *[signature]*
Attorney

United States Patent Office 3,194,222
Patented July 13, 1965

3,194,222
MECHANISM FOR CONTROLLING THE RATE OF RISE OF PRESSURE AND THE MAXIMUM PRESSURES IN HIGHLY-RATED INTERNAL COMBUSTION ENGINES
Thomas Walter Falconer Brown, Dumbreck, Wylam, Northumberland, England, assignor to The British Ship Research Association, London, England
Filed May 18, 1964, Ser. No. 368,258
Claims priority, application Great Britain, May 22, 1963, 20,407
5 Claims. (Cl. 123—33)

This invention relates to mechanism for controlling the rate of rise of pressure and maximum pressure produced in a highly-rated internal combustion engine of the reciprocating type having a cylinder including a main combustion chamber and a main fuel valve for controlling the admission of fuel into said chamber.

According to the invention, the mechanism comprises an auxiliary combustion chamber communicating by way of an orifice with the or each main combustion chamber of the engine, a fuel valve, an auxiliary piston reciprocable in the auxiliary combustion chamber for controlling the volume of said auxiliary chamber, and means for opening said fuel valve a predetermined time before opening of the main fuel valve of the main combustion chamber.

The fuel valve of the auxiliary chamber may be integral with the face of the auxiliary piston adjacent to the orifice and may be adapted to control said orifice.

Preferably, the piston rod of the auxiliary piston is connected by flexible means to an auxiliary pump for supply of fuel to the fuel valve of the auxiliary chamber.

One embodiment of the invention is described by way of example only with reference to the accompanying drawings in which:

FIG. 2 illustrates diagrammatically the mechanism applied to a direct-acting engine; and FIG. 3 is a pressure volume diagram showing in relation to pressure the resultant effect of the auxiliary piston and chamber.

Figure 1:
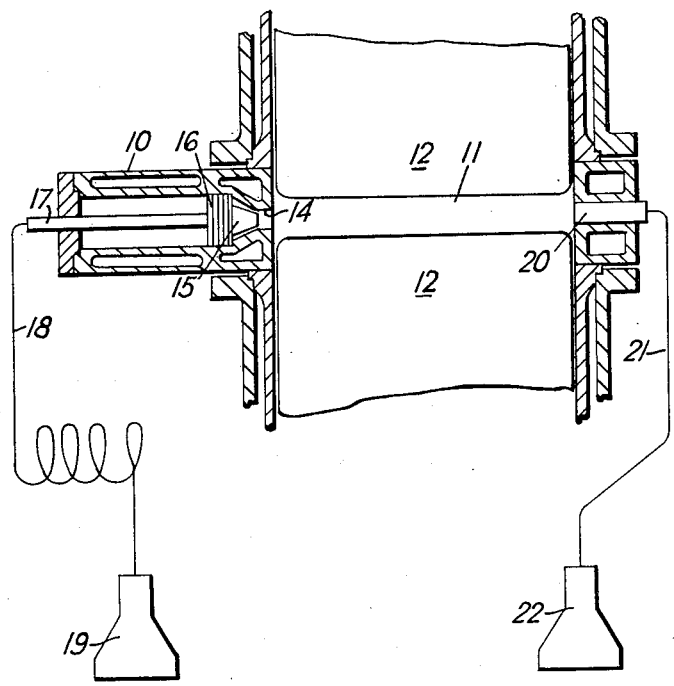
FIG. 1 illustrates diagrammatically the mechanism applied to an opposed piston engine.

Referring to the drawings an auxiliary combustion chamber 10 communicates with a main combustion chamber 11 between opposed pistons 12 (FIG. 1) or above a direct-acting piston 13 (FIG. 2) by way of an orifice 14 controlled by a fuel valve 15 integral with the adjacent face of an auxiliary piston 16 reciprocable in said auxiliary chamber 10 and adapted to control the volume of said auxiliary chamber. The piston rod 17 of the auxiliary piston is hollow and is connected by a flexible line 18 to an auxiliary pump 19 for supply of fuel to the fuel valve 15.

The fuel valve 15 is arranged to be opened in known manner a predetermined time before opening of the main fuel valve 20 of the main combustion chamber which valve 20 is connected by a line 21 to a main fuel pump 22, whereby the products of combustion from the auxiliary chamber 10 will be discharged at a high velocity through the orifice 14 into the main chamber 11. The timing of the main fuel valve 20 will in fact be retarded because ignition of fuel from the main fuel valve 20 will be injected into the zone of flame from the auxiliary chamber 10. The whole of the main charge of fuel injected under control of the pump 22 will ignite instead of there being a large proportion of the fuel entering the chamber 11 in an unignited state before ignition takes place as would be the case due to the period of delay between injection and ignition in the absence of the auxiliary chamber 10.

The auxiliary piston 15 is loaded against premature opening in the compression stroke by suitably adjusted air pressure drawn from a separate source selected normally to represent the final compression pressure when air is being drawn at atmospheric pressure. When high supercharge pressure is used in the air supply to the engine, the final pressure in the cylinder would be greatly increased without the provision of the auxiliary combustion chamber 10. The provision for additional volume controlled by air pressure would prevent any pressure being produced substantially higher than that arising from normal aspiration due to the auxiliary piston 16 moving back in the auxiliary combustion chamber 10 to increase the volume of the auxiliary chamber.

A slight leakage of air through the piston rings into the main combustion chamber 11 is advantageous and the auxiliary combustion chamber 10 would be self-purging when the piston 16 is returned under air pressure on account of a lower pressure in the main cylinder space.

The pressure volume diagram of FIG. 3 shows in relation to pressure the resultant effect of the auxiliary piston and chamber.

I claim:

1. In a mechanism for controlling the rate of rise of pressure and the maximum pressure in a highly-rated internal combustion engine of the reciprocative type having a cylinder including a main combustion chamber and a main fuel valve for controlling the admission of fuel into said combustion chamber, the improvement comprising an auxiliary combustion chamber, an orifice connecting said auxiliary combustion chamber with said main combustion chamber, auxiliary fuel valve means reciprocable in said auxiliary combustion chamber for controlling the volume thereof and for supplying fuel thereto, and means for opening said auxiliary fuel valve means a predetermined time before opening of said main fuel valve.

2. In a mechanism for controlling the rate of rise of pressure and the maximum pressure in a highly-rated internal combustion engine of the reciprocative type having a cylinder including a main combustion chamber and a main fuel valve for controlling the admission of fuel into said combustion chamber, the improvement comprising an auxiliary combustion chamber, an orifice communicating said main combustion chamber with said auxiliary combustion chamber, an auxiliary piston reciprocable in said auxiliary combustion chamber for controlling the volume of said auxiliary chamber, an auxiliary fuel valve integral with the face of said auxiliary piston adjacent to said orifice and adapted to control said orifice, and means for opening said auxiliary fuel valve a predetermined time for admitting fuel to the auxiliary combustion chamber before opening of said main fuel valve.

3. In a mechanism for controlling the rate of rise of pressure and the maximum pressure in a highly-rated internal combustion engine of the reciprocative type having a cylinder including a main combustion chamber and a main fuel valve for controlling the admission of fuel into said combustion chamber, the improvement comprising an auxiliary combustion chamber, an orifice communicating said auxiliary combustion chamber with said main combustion chamber, an auxiliary piston reciprocable in said auxiliary combustion chamber for controlling the volume of said auxiliary chamber, an auxiliary fuel valve in said auxiliary piston for admitting fuel to the auxiliary combustion chamber, piston rod means connected to said auxiliary piston and auxiliary fuel valve, an auxiliary pump, and flexible means connected between said piston rod means and said auxiliary pump for supply of fuel from said pump through said flexible means and piston rod means to said auxiliary fuel valve.

4. In a mechanism for controlling the rate of rise of pressure and the maximum pressure in a highly-rated internal combustion engine of the reciprocative type having a cylinder including a main combustion chamber and a main fuel valve for controlling the admission of fuel into said combustion chamber, the improvement comprising an auxiliary combustion chamber, an orifice connecting said auxiliary combustion chamber with said main combustion chamber, an auxiliary piston reciprocable in said auxiliary combustion chamber for controlling the volume of said auxiliary chamber, and an auxiliary fuel valve in said auxiliary combustion chamber with said auxiliary piston and disposed on the same side of said orifice as said auxiliary piston for directing fuel through the auxiliary combustion chamber.

5. In a mechanism as set forth in claim 3 in which said piston rod means comprises a hollow piston rod.

References Cited by the Examiner
UNITED STATES PATENTS

| | | | |
|---|---|---|---|
| 2,146,032 | 2/39 | Scott | 123—33 |
| 2,262,981 | 11/41 | Weber | 123—33 |
| 2,463,418 | 3/49 | Pescara. | |
| 2,910,826 | 11/59 | Mansfield | 60—13 |

MARK NEWMAN, *Primary Examiner.*

RICHARD B. WILKINSON, *Examiner.*